(12) United States Patent  (10) Patent No.: US 8,867,838 B2
Balamurugan et al.  (45) Date of Patent: Oct. 21, 2014

(54) METHOD AND SYSTEM FOR A TEXT DATA ENTRY FROM AN ELECTRONIC DOCUMENT

(75) Inventors: Chithralekha Balamurugan, Pondicherry (IN); Shourya Roy, Bangalore (IN); Jacki O'Neill, Grenoble (FR); Sujit Gujar, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 223 days.

(21) Appl. No.: 13/612,958

(22) Filed: Sep. 13, 2012

(65) Prior Publication Data

US 2014/0072222 A1  Mar. 13, 2014

(51) Int. Cl.
*G06K 9/34*  (2006.01)

(52) U.S. Cl.
USPC .......................................... 382/180; 382/176

(58) Field of Classification Search
USPC .................. 382/176, 180, 190, 195, 224, 305
See application file for complete search history.

(56) References Cited

U.S. PATENT DOCUMENTS

| 7,231,082 | B2 | 6/2007 | Lenoir | |
|---|---|---|---|---|
| 7,606,741 | B2* | 10/2009 | King et al. | 705/27.2 |
| 8,571,319 | B2* | 10/2013 | Balasubramanian et al. | 382/176 |
| 2003/0108243 | A1* | 6/2003 | Charpentier | 382/190 |
| 2003/0140306 | A1 | 7/2003 | Robinson | |
| 2006/0088214 | A1* | 4/2006 | Handley et al. | 382/176 |
| 2007/0140560 | A1* | 6/2007 | Katsuyama et al. | 382/176 |
| 2009/0097769 | A1 | 4/2009 | Velasquez et al. | |
| 2009/0187598 | A1 | 7/2009 | Vohariwatt et al. | |
| 2010/0325156 | A1 | 12/2010 | Plainfield | |
| 2013/0236110 | A1* | 9/2013 | Barrus | 382/224 |

OTHER PUBLICATIONS www.crowdflower.com; Crowdsourcing, Labor on Demand; "The World's Largest Workforce"; 2012.
www.microtask.com; "Human Powered Document Processing".
U.S. Appl. No. 13/350,965, filed Jan. 16, 2012; Roy et al; Feedback Based Technique Towards Total Completion of Tasks in Crowdsourcing.

* cited by examiner

*Primary Examiner* — Phuoc Tran

(57) ABSTRACT

A method for processing an electronic document is provided. The electronic document includes a plurality of text fields and a text label associated with each of the plurality of text fields. The method includes step of extracting the plurality of text fields from the electronic document. The method includes step of grouping the plurality of extracted text fields to generate a plurality of groups. The method includes step of labeling the plurality of groups based on a first pre-defined criteria to generate a plurality of labeled groups. The method includes step of distributing the plurality of labeled groups in a plurality of queues based on a second pre-defined criteria. The method includes step of transmitting the plurality of labeled groups from the plurality of queues to one or more crowdworkers based on a third pre-defined criteria.

23 Claims, 6 Drawing Sheets

REGISTRATION FORM

Name: John
102a  102

Birth Date: 12/10/1975
104a  104

Policy No: 123456AC
106a  106

Address: 456, AB Street, Florida
114a  114

Telephone: 123-555-1236
116a  116

Mobile: 225-4444-7475
118a  118

Security Number: 45-9789
108a  108

Occupation: Tennis pro
110a  110

Employer: Adventure pro
112a  112

REGISTRATION FORM

John
102

12/10/1975
104

123456AC
106

456, AB Street, Florida
114

123-555-1236
116

225-4444-7475
118

45-9789
108

Tennis pro
110

Adventure works
112

METHOD AND SYSTEM FOR A TEXT DATA ENTRY FROM AN ELECTRONIC DOCUMENT

TECHNICAL FIELD

The presently disclosed embodiments are related to processing of an electronic document. More particularly, the presently disclosed embodiments are related to a method and system for a text data entry from the electronic document.

BACKGROUND

Various data capture methods and techniques are available to capture hand-written data from paper forms. Typically, the paper form is scanned on a scanner to produce an electronic format of the paper form in the computer. Thereafter a software application processes the hand-written text data and extracts therefrom all of the hand-written text data.

While the process of data capture is a straightforward process, it is considered a tedious task for a business organization dealing with numerous paper forms. Since, business organizations process large quantities of handwritten or machine printed data forms in order to accomplish their business objectives, data capture remains a problematic and expensive endeavor for such business organizations.

Lately, crowdsourcing has emerged as an important and economical labor pool for business organizations. Crowdsourcing provides a promising solution for performing voluminous human intelligence tasks such as video analysis, image labeling, etc. However, the shortcoming in applying crowdsourcing for data entry of paper forms is that when the paper form containing sensitive or confidential information is presented to crowdsourced workers, the sensitive or confidential information may be viewed by the crowdsourced workers and could possibly be misused.

Therefore, there is a need to provide an efficient method and system for processing paper forms for data entry.

SUMMARY

According to embodiments illustrated herein, there is provided a computer implementable method for processing an electronic document. The electronic document includes a plurality of text fields and a text label associated with each of the plurality of text fields. The method includes a step of extracting the plurality of text fields from the electronic document. The method further includes a step of grouping the plurality of extracted text fields to generate a plurality of groups. The method further includes a step of labeling the plurality of groups based on a first pre-defined criteria to generate a plurality of labeled groups. The method further includes a step of distributing the plurality of labeled groups in a plurality of queues based on a second pre-defined criteria. The method further includes a step of transmitting the plurality of labeled groups from the plurality of queues to one or more crowdworkers based on a third pre-defined criteria.

According to embodiments illustrated herein, there is provided a system for processing an electronic document. The electronic document comprises a plurality of text fields and a text label associated with each of the text fields. The system includes an extraction module, a distribution module, and a validation module. The extraction module is configured for extracting the plurality of text fields from the electronic document. The extraction module is further configured for generating one or more groups by grouping the extracted text fields. The distribution module is configured for distributing one or more groups to one or more crowdworkers, wherein the one or more groups is processed to generate a processed text field data by one or more crowdworkers. Lastly, the validation module is configured for validating the processed text field data.

According to embodiments illustrated herein, there is provided a computer program product for processing an electronic document. The electronic document includes a plurality of text fields and a text label associated with each of the plurality of text fields. The computer program code includes program instruction means for extracting a plurality of text fields from the electronic document. The computer program code further includes program instruction means for grouping the plurality of extracted text fields to generate a plurality of groups. The computer program code further includes program instruction means for labeling the plurality of groups based on a first pre-defined criteria to generate a plurality of labeled groups. The computer program code further includes program instruction means for distributing the plurality of labeled groups in a plurality of queues based on a second pre-defined criteria. Lastly, the computer program code further includes program instruction means for transmitting the plurality of labeled groups from the plurality of queues to one or more crowdworkers based on a third pre-defined criteria.

BRIEF DESCRIPTION OF DRAWINGS

The accompanying drawings illustrate various embodiments of systems, methods, and embodiments of various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which:

FIG. 1 depicts a layout of an electronic document in accordance with at least one embodiment;

FIG. 3 depicts a layout of an electronic document with erased text labels in accordance with at least one embodiment;

DETAILED DESCRIPTION

Figure 2:
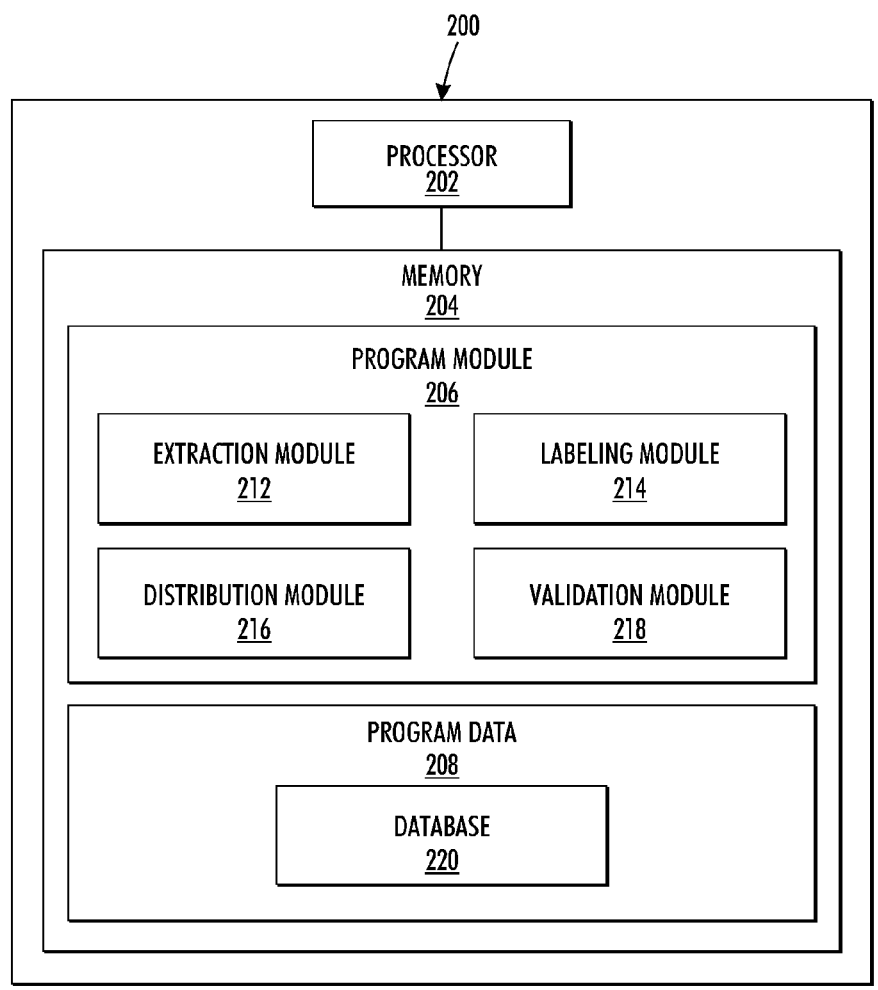
FIG. 2 is a block diagram illustrating a system for processing an electronic document in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meaning set forth below.

"Electronic document" refers to a collection of data, including image data, in any format, retained in an electronic form. The electronic document can contain one or more texts, symbols, or the like. In an embodiment, the electronic document is obtained by scanning a corresponding physical document including but not limited to a handwritten document. The electronic document can be stored in various file formats, such as, JPG or JPEG, GIF, TIFF, PNG, BMP, RAW, PSD, PSP, PDF, and the like. Various examples of the electronic document include, but are not limited to, any application form, such as, an employment form, a medical insurance claim form, a driving license application, or the like.

"Text field" refers to a collection of text data contained within a portion of the electronic document.

"Text data" refers to an alphabetic character, a numeric character, an alphanumeric character, or any symbol.

"Text label" refers to a word or a phrase heading a piece of the text field to indicate or summarize its contents.

"Crowdworkers" refer to a worker or a group of workers that may perform one or more tasks that generate data that contribute to a defined result, such as proofreading part of a digital version of an ancient text or analyzing a small quantum of a large volume of data. According to the present disclosure, the crowdsourced workforce includes an internet-based employee. Hereinafter, "crowdsourced workforce," "crowdworker," and "crowd" may be interchangeably used.

"Crowdsourcing" refers to distributing tasks by soliciting the participation of defined groups of users. A group of users may include, for example, individuals responding to a solicitation posted on a certain website such as Amazon Mechanical Turk or Crowd Flower.

The present disclosure along with the detailed figures and description set forth herein describes a method and a system for a text data entry from an electronic document. The method and the system facilitate the text data entry to a database by one or more crowdworkers without compromising on the security of personal and confidential text data related to a user contained within the electronic document.

FIG. 1 depicts a layout of an electronic document 100 in accordance with at least one embodiment. The layout of the electronic document 100 depicts a plurality of text fields. The plurality of text fields includes a text field 102 (John), a text field 104 (Dec. 10, 1975), a text field 106 (123456AC), a text field 108 (45-9789), a text field 110 (Tennis pro), a text field 112 (Adventure pro), a text field 114 (456 AB Street Florida), a text field 116 (123-555-1236), and a text field 118 (225-4444-7475). The text fields 102, 104, 106, 108, 110, 112, 114, 116, and 118 further has a corresponding text label 102a (Name), text label 104a (DOB), text label 106a (Policy Number), text label 108a (Security Number), text label 110a (Occupation), text label 112a (Employer), text label 114a (Address), text label 116a (Telephone), and text label 118a (Mobile No.) respectively. Thus, it is understood that each of the plurality of text fields correspond to at least one of a plurality of text labels. Hereinafter the plurality of text fields is represented by 101 and the plurality of text labels will be represented by 101b.

Although the layout of the electronic document 100 shows a limited number of text fields and text labels for simplicity, it may be appreciated that the disclosed embodiments can be implemented for a large or lesser number of text fields and text labels. It will be further understood by a person having ordinary skills in the art that the text fields and the text labels in the electronic document 100 will vary depending on the type of the electronic document 100.

FIG. 2 is a block diagram illustrating a system 200 for processing the electronic document 100 in accordance with at least one embodiment. In an embodiment, the system 200 is configured for a text data entry from the electronic document 100 using one or more crowdworkers.

The system 200 includes a processor 202 and a memory 204. The processor 202 is coupled with the memory 204. In an embodiment, the system 200 corresponds to a computing device such as, a Personal Digital Assistant (PDA), a Smartphone, a tablet PC, a laptop, a personal computer, a mobile phone, a Digital Living Network Alliance (DLNA)-enabled device, or the like.

The processor 202 is configured to execute a set of instructions stored in the memory 204 to perform one or more operations. The processor 202 fetches the set of instructions from the memory 204 and executes the set of instructions. The processor 202 can be realized through a number of processor technologies known in the art. Examples of the processor can be an X86 processor, a RISC processor, an ASIC processor, or any other processor. In an embodiment, the processor 202 includes a Graphics Processing Unit (GPU) that executes the set of instructions to perform one or more processing operations.

The memory 204 is configured to store the set of instructions or modules. Some of the commonly known memory implementations can be, but are not limited to, a Random Access Memory (RAM), a Read-Only Memory (ROM), a Hard Disk Drive (HDD), and a secure digital (SD) card. The memory 204 includes a program module 206 and a program data 208. The program module 206 includes a set of instructions that can be executed by the processor 202 to perform specific actions on the system 200. The program module 206 includes an extraction module 212, a labeling module 214, a distribution module 216, and a validation module 218. It will be understood by a person having ordinary skills in the art that the set of instructions are stored in the memory 204 in conjunction with various hardware of the system 200 to perform various operations.

The program data 208 includes a database 220. The database 220 is a storage device that stores the data submitted from and/or required by the extraction module 212, the labeling module 214, the distribution module 216, and the validation module 218. In an embodiment, the database 220 can be implemented using technologies including, but not limited to Oracle®, IBM DB2®, Microsoft SQL Server®, Microsoft Access®, PostgreSQL®, MySQL® and SQLite®, and the like. In an embodiment, the database 220 stores the electronic document 100. It will be understood by a person having ordinary skills in the art that the database 220 may store a plurality of electronic documents wherein each of the electronic document may be of same or different type/field.

The system 200 further includes the extraction module 212. The extraction module 212 is configured to erase each of the plurality of text labels 101a in the electronic document 100, and thereafter extract the plurality of text fields 101 to generate a plurality of groups. The extraction module 212 receives the electronic document 100 from the database 220. In an embodiment, the electronic document 100 is a digital image of a handwritten document. In another embodiment, the system 200 may obtain a hand-written document from the database 220. In such a case, the extraction module 212 is configured for facilitating the generation of the digital image based on the handwritten document. The extraction module 212 facilitates the compilation of the digital image data captured by various image-capturing units such as scanners to generate the electronic document 100 from the handwritten document.

In an embodiment, the extraction module 212 is configured to erase each of the plurality of text labels 101a in the electronic document 100. The erasing of each of the plurality of text labels 101a is performed by any suitable erasing technique known in the art. In another embodiment, the extraction module 212 is configured to modify each of the plurality of text labels 101a in the electronic document 100. The modification of each of the plurality of text labels 101a includes blurring of each of the plurality of text labels 101a. The blurring of each of the plurality of text labels 101a distorts the outline or appearance of each of the plurality of text labels 101a in a way that no person other than an administrator of the system 200 is able to read and interpret each of the plurality of text labels 101a in the electronic document 100. The blurring of each of the plurality of text labels 101a is performed by any suitable blurring technique known in the art. The modification of each of the plurality of text labels 101a further includes renaming each of the plurality of text labels 101a with trivial information.

In an embodiment of the present disclosure, the extraction module 212 erases each of the plurality of text labels 101a in the electronic document 100 to generate an "electronic document with erased text labels" 300 as shown in FIG. 3.

FIG. 3 depicts the layout of the "electronic document with erased text labels" 300 in accordance with at least one embodiment. The electronic document with erased text labels 300 depicts the plurality of text fields 101. Hereinafter "electronic document with erased text labels" 300 will be referred to as electronic document 300.

Referring back to FIG. 2, the extraction module 212 of the system 200 is further configured for extracting the plurality of text fields 101 from the electronic document 300. In order to extract the plurality of text fields 101 contained in the electronic document 300, the extraction module 212 facilitates the splitting of the electronic document 300 by using any suitable splitting technique known in the art. In an embodiment, the entire electronic document 300 is split into smaller sections. In another embodiment, at least one section is split from the entire electronic document 300.

In an embodiment, in order to split the electronic document 300, the extraction module 212 implements a coordinate-based method. In this method, the extraction module 212 facilitates marking of a plurality of coordinates corresponding to a periphery of each of the plurality of text fields 101 in the electronic document 300. The plurality of coordinates is marked around the periphery of each of the plurality of text fields 101 in such a way that a box (for example, of rectangular shape) is formed around each of the plurality of text fields 101. The box formed around each of the plurality of text fields 101 is provided as an input to any known suitable splitting technique. Thereafter a portion of the box formed around each of the plurality of text fields 101 in the electronic document 300 is split from the electronic document 300. In this way, each of the plurality of text fields 101 is split from the electronic document 300 to generate a plurality of fragments. In an embodiment, each split text field represents a fragment. The detailed explanation of formation of these fragments will now be explained in conjunction with FIG. 4.

Figure 4:
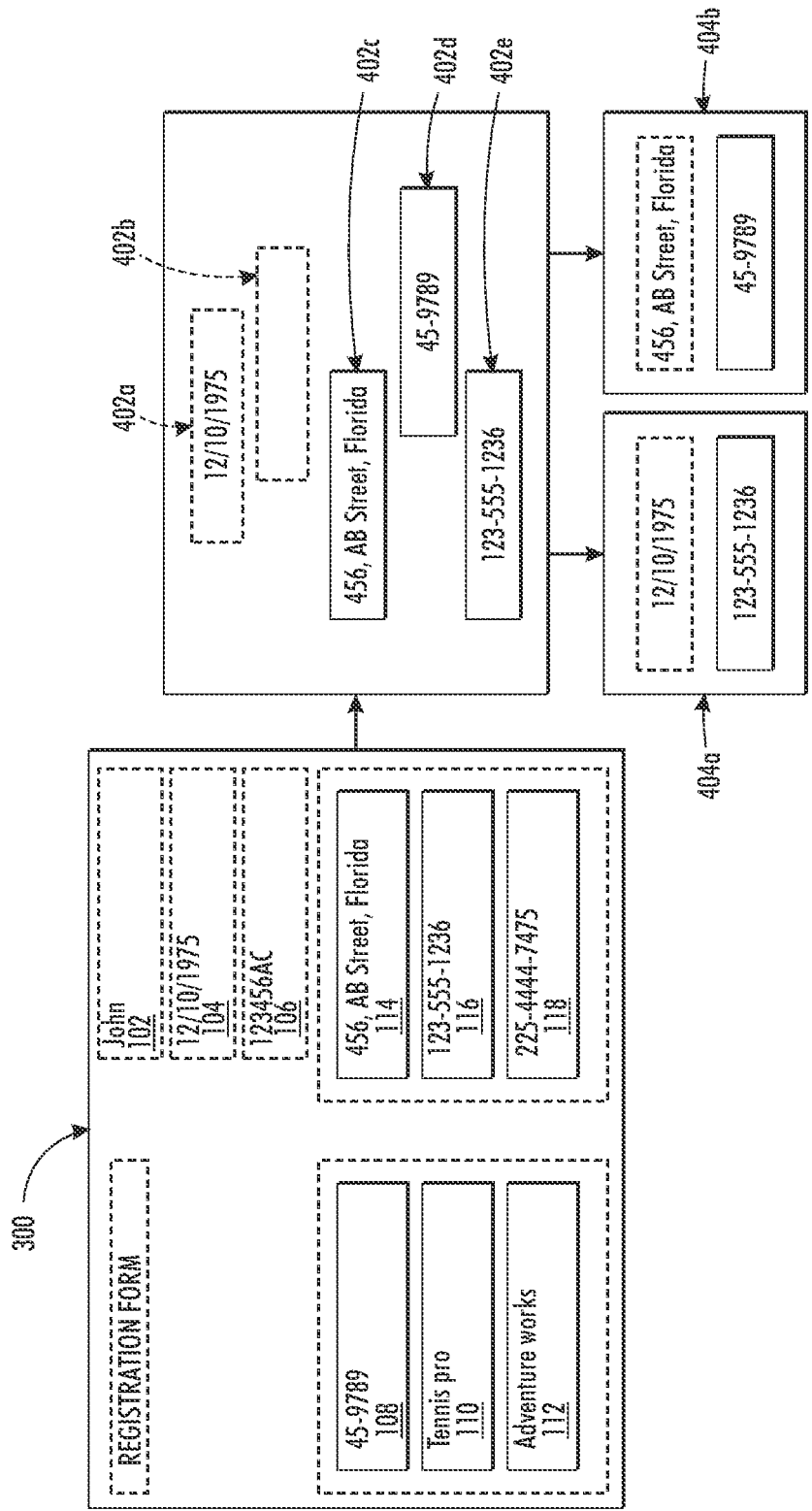
FIG. 4 illustrates the grouping of extracted text fields by an extraction module in accordance with at least one embodiment.

FIG. 4 illustrates the grouping of extracted text fields by an extraction module in accordance with at least one embodiment. As explained above, the extraction module 212 is configured to split the plurality of text fields 101 to generate the plurality of fragments. The plurality of fragments includes fragment 402a, fragment 402b, fragment 402c, fragment 402d, and fragment 402e (hereinafter referred to as 402). Although the FIG. 4 shows only five fragments for simplicity and each of the five fragments include one text field of the plurality of text fields 101, it will be apparent to a person having ordinary skill in the art that in another embodiment, each of the fragments may include one or more text fields of any given electronic document.

In an embodiment, each fragment of the plurality of fragments 402 corresponds to at least one of the plurality of text fields 101. It will be understood by a person having ordinary skill in the art that each fragment of the plurality of fragments 402 represents a different text field of the plurality of text fields 101. In an embodiment, each of the plurality of fragments 402 is stored in the database 220.

In an embodiment, the extraction module 212 is configured to group the plurality of fragments 402 to generate the plurality of groups 404a, 404b (hereinafter referred to as 404). For example, the fragments 402a and 402e are grouped to form the group 404a, and the fragments 402c and 402d are grouped to form the group 404b. Similarly, all of the plurality of fragments 402 are grouped in batches of two or more to generate the plurality of groups 404. In an alternate embodiment, the extraction module 212 is configured to generate the plurality of the groups 404 by directly grouping the text fields of the plurality of text fields 101 of the electronic document 300. In an embodiment, the plurality of groups are stored in the database 220. It will be appreciated by a person having ordinary skill in the art that each group of the plurality of groups 404 includes one or more fragments of the plurality of fragments 402.

The extraction module 212 facilitates grouping of the plurality of fragments 402 to form the plurality of groups 404 in a way that one or more fragments of the plurality of fragments 402 having similar or related text data contained therewith are grouped together. However, it will be understood by a person having ordinary skills in the art that any suitable criteria or rules can be adapted for grouping of the fragments of the plurality of fragments 402. For example, the technique to group the plurality of fragments 402 to form the plurality of groups 404 will be different for a medical insurance electronic document with respect to an insurance survey electronic document. In one embodiment, the plurality of text fields 101 are grouped to form the plurality of groups 404 such that each group of the plurality of groups 404 includes fragments of the plurality of fragments 402 that are to be worked upon by a single group of users. For example, in any given electronic document containing individual invoices field and total invoices, a group will be formed containing both, the individual invoices field and the total invoices. The formed group may be sent to a single group of crowdworkers for the text data entry along with the verification of total invoices.

Referring back to FIG. 2, the system 200 further includes the labeling module 214 and the distribution module 216. The labeling module 214 labels the plurality of groups 404 generated by the extraction module 212, and sends it to the distribution module 216, which distributes the plurality of groups 404 (which are labeled) to appropriate group of workers (including crowdworkers and internal workers) for processing. The processing specifies the text data entry of the available text data in the plurality of groups 404.

The functionality of the labeling module 214 will now be explained in detail. The labeling module 214 is configured to receive the plurality of groups 404 generated by the extraction module 212. In an embodiment, the labeling module 214 labels the plurality of groups 404 to generate a plurality of labeled groups. The labeling of the plurality of groups 404 is performed based on a first pre-defined criteria. The first pre-defined criteria includes one or more rules. The one or more rules specifies the labeling technique to be used for labeling the at least one group of the plurality of groups 404.

In an embodiment, the labeling techniques include a security-based labeling; a rejection-based labeling, and a dependency-based labeling. The different labeling techniques are used to label each of the plurality of groups 404 such that each of plurality of labeled groups (obtained after labeling) can then be distributed to the appropriate crowd workers via the distribution module 216.

In an embodiment, the labeling module 214 performs the security-based labeling for at least one group of the plurality of groups 404 so that each of the plurality of groups 404 can be distributed to the appropriate crowd via the distribution module 216. The security-based labeling is performed for those groups within the plurality of groups 404 that require either a confidential access, or a restricted access, or a general access. For example, each group of the plurality of groups 404 that includes personal/private information (of a user whose details are available in the electronic document 300) is labeled as per the security-based labeling technique.

In an embodiment, the group requiring confidential access includes one or more fragments of the plurality of fragments 402 having a confidential text data, and is to be processed and operated by the internal workforce of the organization owning the electronic document 300. The group requiring restricted access will include one or more fragments of the plurality of fragments 402 having the restricted text fields (for examples, telephone numbers, insurance numbers etc present in any given electronic document), and is to be processed and operated by any alternate workforce (alternate workforce include but is not limited to a satellite centre employee, a rural BPO firm employee, and a home based employee). The group requiring general access will include one or more fragments of the plurality of fragments 402a, 402b, 402c, 402d, and 402e having general text fields, and is to be processed and operated by crowdworkers.

In an embodiment, the labeling module 214 labels at least one group of the plurality of groups 404 by security-based labeling technique to generate at least one or more of a confidential access group, a restricted access group, and a general access group.

In an embodiment, the labeling module 214 performs the rejection-based labeling for the at least one group of the plurality of groups 404. The rejection-based labeling is performed for those groups within the plurality of groups 404 that has a probability of rejection. The probability of rejection is determined based on one or more rejection criteria. The one or more rejection criteria includes a condition in which the plurality of groups 404 and the associated text fields of the plurality of groups 404 may have any miscellaneous errors related to wrongly filled information in the electronic document 300. For example, in any given electronic document containing individual invoices amount field and total invoice amount field, there is a possibility that a crowdworker may wrongly total the invoice amount. Thus, the group formed containing such fields (individual invoice amount field and total invoice amount field) will have a probability of rejection (due to the possibility of a calculation error) and will be labeled by rejection-based labeling technique.

The labeling module 214 labels at least one group of the plurality of groups 404 by the rejection-based labeling technique to generate a high reject group and/or a low reject group. It will be understood by a person having ordinary skills in the art that a number of conditions/limitations can be used to define the probability of rejection depending on the content of the electronic document 300. In an embodiment, the at least one group of the plurality of groups 404 labeled by the rejection-based labeling technique is first sent to the crowdworkers.

The high reject group includes the fragments of the plurality of fragments 402, which have higher probability of rejection, and the low reject group includes the fragments of the plurality of fragments 402, which have a lower probability of rejection. The probability of rejection is high or low depending on the probability of miscellaneous errors related to wrongly filled information contained in the plurality of groups. It will be understood by a person having ordinary skill in the art that any other criteria (excluding the presence of errors) can be used to specify the probability of rejection.

In an embodiment, the labeling module 214 performs dependency-based labeling for at least one group of the plurality of groups 404 based on the dependency of at least one group on the remaining groups of the plurality of groups 404. The dependency between any two groups of the plurality of groups 404 is determined by comparing and analyzing the relation between the text fields of the two groups of the plurality of groups 404.

The distribution module 216 of the system 200 is configured to receive the plurality of labeled groups from the labeling module 214, and distribute the plurality of labeled groups to the appropriate group of workers. The group of workers includes one or more crowdworkers, internal workforce, or alternate workforce.

The distribution module 216 distributes the plurality of labeled groups into at least two queues based on a second pre-defined criteria. A queue specifies a collection in which the entities (labeled groups) are kept in a pre-defined order. In an embodiment, the second pre-defined criteria defines the distribution of the plurality of labeled groups to the crowdworkers on the basis of the labeling classification. In another embodiment, the second pre-defined criteria defines the distribution of the plurality of labeled groups depending upon the order of dispatching of each labeled group of the plurality of labeled groups to one or more crowdworkers. The order of dispatching specifies the pre-defined arrangement of the plurality of labeled groups in each queue. For example, in each queue, the plurality of labeled groups are organized in a sequence such that each of the plurality of labeled groups is sent to the one or more crowdworkers sequentially in the same order. It will be understood by a person with ordinary skills in the art that any suitable criteria can be used to categorize and distribute each of the plurality of labeled groups into at least two queues.

The distribution module 216 will now be explained in more detail in conjunction with the explanation for FIG. 5.

Figure 5:
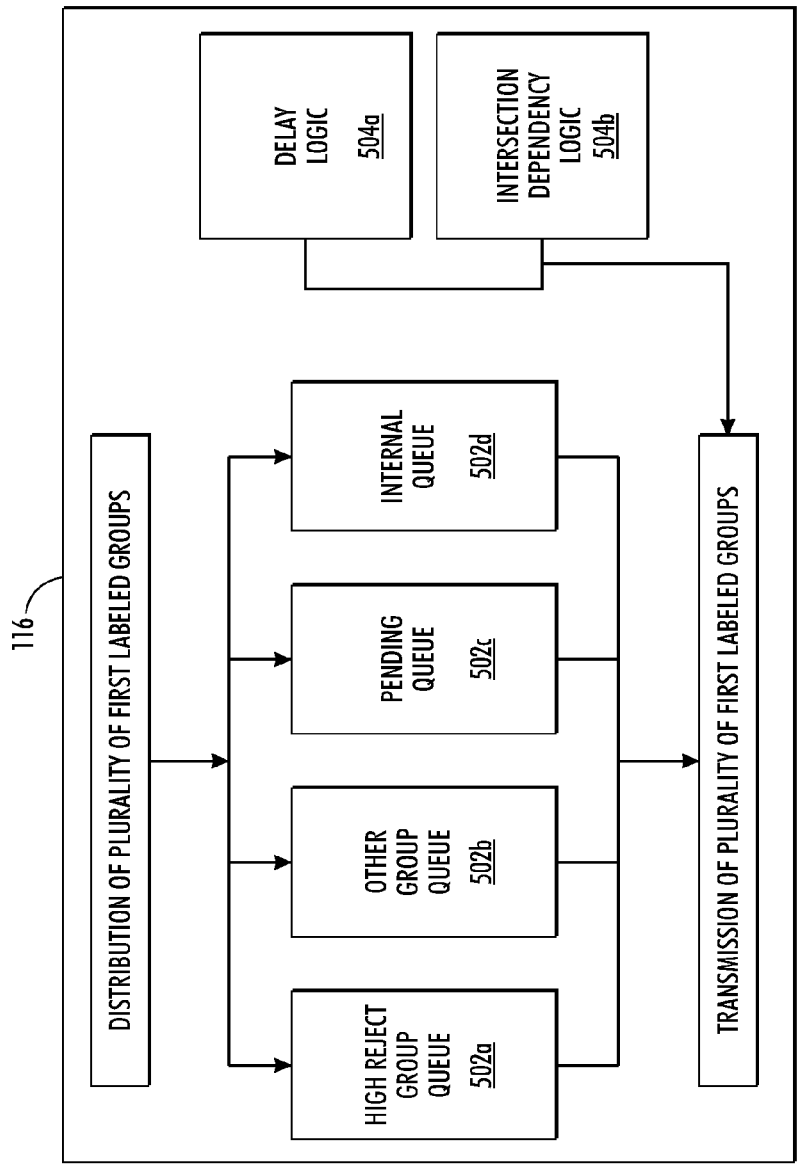
FIG. 5 is a block diagram illustrating the workflow of a distribution module in accordance with at least one embodiment.

FIG. 5 is a block diagram illustrating the workflow of a distribution module in accordance with at least one embodiment. The distribution module 216 distributes the plurality of labeled groups into four queues. The four queues include a high reject group's queue 502a, another group's queue 502b, a pending queue 502c, and an internal queue 502d. The distribution module 216 distributes the plurality of labeled groups such that the high reject groups received from the labeling module 214 are sent into the high reject group's queue 502a. The distribution module 216 further distributes remaining of the plurality of labeled groups in the other group's queue 502b.

The pending queue 502c includes the one or more labeled groups of the plurality of labeled groups that have to be re-transmitted to the one or more crowdworkers. The one or more labeled groups of the plurality of labeled groups that have to be re-transmitted includes at least one text field of the plurality of text fields 101 in which an error is found by the one or more crowdworkers while processing the at least one text field. The internal queue 502d includes the one or more labeled groups of the plurality of labeled groups that are labeled as confidential access groups. The internal queue 502s further includes the one or more labeled groups of the plurality of labeled groups that have been rejected by the one or more crowdworkers while processing so that the internal workforce can work on it.

In another embodiment, the plurality of queues may also include a reject queue. The reject queue includes the one or more labeled groups of the plurality of labeled groups that have been rejected by the one or more crowdworkers while processing the text fields associated with the one or more labeled groups of the plurality of labeled groups.

The distribution module 216 further transmits at least one labeled group of the plurality of labeled groups from the plurality of queues (502a, 502b, 502c, 502d). The plurality of labeled groups is transmitted to one or more crowdworkers based on a third pre-defined criteria. The one or more crowdworkers processes the plurality of the labeled groups to generate a processed text field data. The processed text field data specifies the text data entry of the plurality of text fields 101.

The third pre-defined criteria includes one or more rules that define a delay logic 504a and a intersection dependency logic 504b. The delay logic 504a introduces a delay in the transmission of at least one labeled group of the plurality of the labeled groups from the plurality of queues. Further, the introduced delay is for a pre-specified period.

In an embodiment, the distribution module 216 initially transmits the labeled groups of the plurality of labeled groups from the high reject group's queue 502a to the one or more crowdworkers. Based on the third pre-defined criteria (delay logic 504a), the distribution module 216 introduces a delay in the transmission of the labeled groups of the plurality of labeled groups from the other group's queue 502b to one or more crowdworkers. In an embodiment, for example, if the status received after processing the labeled groups of the high reject group's queue 502a turns out to be 'REJECT' then the other corresponding groups need not be transmitted. In an embodiment, a pre-specified time delay is introduced until the status received after processing the labeled groups of the high reject group's queue 502a is 'DONE.' Thereafter, the distribution module will dispatch the labeled groups from the other group's queue 502b to the crowd workers.

The third pre defined criteria also includes the intersection dependency logic 504b. The intersection dependency logic 504b specifies a degree of dependency. The degree of dependency specifies the relationship of one label group of the plurality of the labeled groups in the plurality of queues with the remaining label groups of the plurality of the labeled groups.

In an embodiment, the distribution module 216 transmits the labeled groups from the plurality of queues such that the labeled groups that are dependent on each other are sent one after the other to one or more crowdworkers. For example, if the labeled group A and labeled group B are dependent on each other, the distribution module 216 will transmit the labeled group A to the crowdworkers first followed by the labeled group B. It will be understood by a person having ordinary skills in the art that dependency of the labeled group A (dependent group) on the labeled group B (dependee group) illustrates that the crowdworker needs to work on the labeled group B before working on the labeled group A. Hence, the work (processing) of the labeled group B needs to be completed before the labeled group A is transmitted to crowdworkers.

In an embodiment, the distribution module 216 further transmits the plurality of labeled groups from the plurality of queues to the crowdworkers in a one-by-one sequence. It will be appreciated by a person having ordinary skill in the art that transmitting information to the crowdworkers in a one-by-one sequence curtails the crowdworkers from forming a relation between the information present in the multiple labeled groups sent by the distribution module 216.

The one or more crowdworkers process the one or more label groups of the plurality of label groups to generate the processed text field data (the entry of the text data contained in the plurality of labeled groups). The distribution module 216 stores the processed text field data in the database 220.

The system further includes a validation module 218 configured to validate the processed text field data received from the one or more crowdworkers and stored in the database 220. In an embodiment, the validation module 218 includes a correctness resolution function. The correctness resolution function facilitates the automatic correction of the incorrectly filled text fields in the plurality of labeled groups based on the processed text field data. During the processing of a given labeled group of the plurality of labeled groups, if any redundant entry for any particular text field in the given labeled group is determined, the given labeled group is sent to the validation module 218, which corrects the text field data of the given labeled group automatically.

The validation module 218 further includes an automatic validation function. The automatic validation function checks the validity of the processed text field data. The processed text field data is checked and verified by the validation module by applying a pre-defined validation criteria. The pre-defined validation criteria include one or more rules. In one embodiment, one or more rules relate to the spelling check of the processed text field data.

Figure 6:
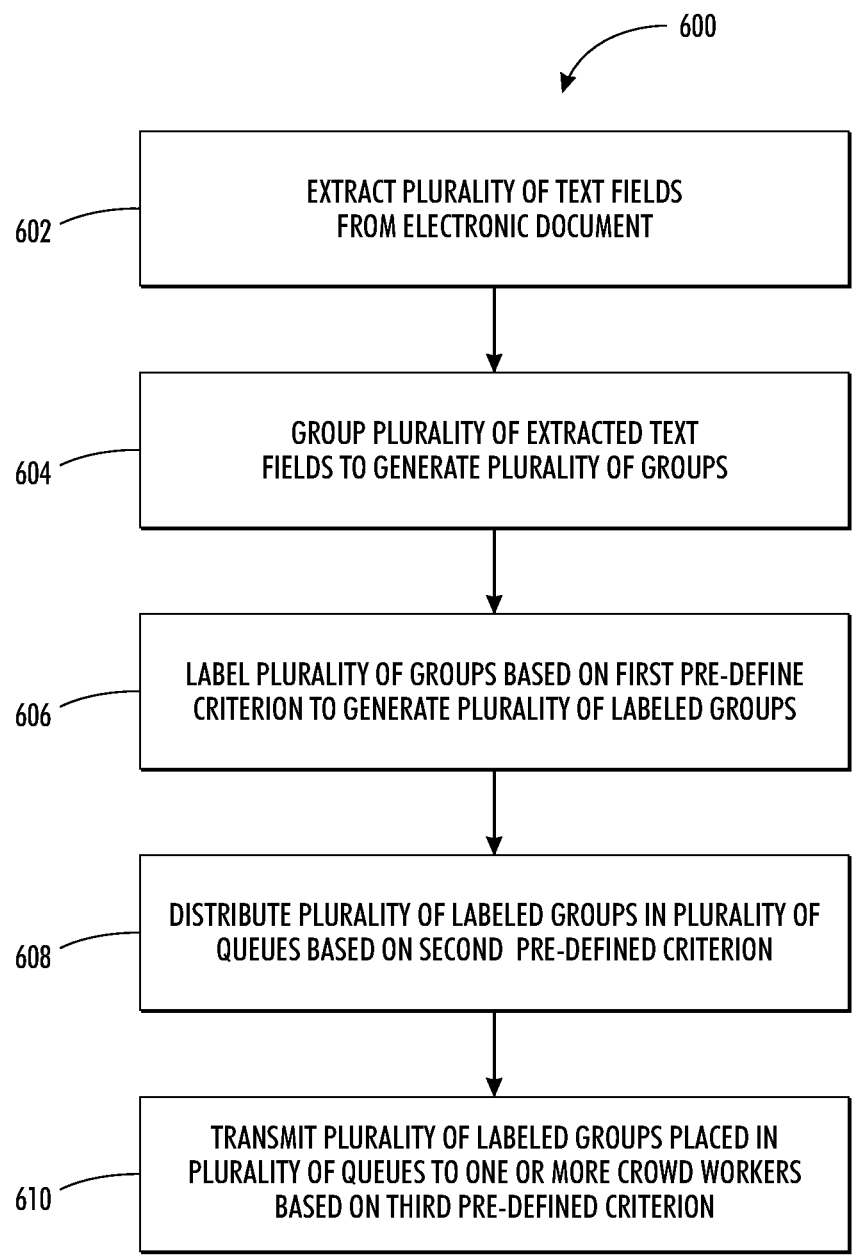
FIG. 6 is a flow diagram illustrating a method for processing an electronic document in accordance with at least one embodiment.

FIG. 6 is a flow diagram illustrating a method for processing the electronic document 300 according to at least one embodiment.

At step 602, the plurality of text fields 101 are extracted from the electronic document 300. In an embodiment, the plurality of text fields 101 from the electronic document 300 are extracted by the extraction module 212. The extraction module 212 receives the electronic document 300 from the database 220 and thereafter extracts the plurality of text fields 101 from the electronic document 300. The detailed process of extracting is explained in conjunction with FIG. 1.

At step 604, the plurality of extracted text fields (also referred as the plurality of fragments 402) are grouped to generate the plurality of groups 404. In an embodiment, the grouping of the plurality of extracted text fields (also referred as the plurality of fragments 402) is performed by the extraction module 212 to generate the plurality of groups 404. The detailed process of grouping is explained in conjunction with FIG. 1.

At step 606, the plurality of groups 404 are labeled based on the first pre-defined criteria to generate a plurality of labeled groups. In an embodiment, the labeling of plurality of groups is performed by the labeling module 214. The labeling module 214 receives the plurality of groups 404 from the extraction module 212, and labels each of the plurality of groups 404 based on the first pre-defined criteria. The detailed process of labeling is explained in conjunction with FIG. 1.

At step 608, the plurality of labeled groups is distributed in the plurality of queues based on the second pre-defined criteria. In an embodiment, the distribution of the plurality of labeled groups in the plurality of queues is performed by the distribution module 216. The distribution module 216 receives the plurality of labeled groups from the labeling module 214, and distributes each of the plurality of labeled groups in one or more of the plurality of queues depending on the second pre-defined criteria. The process of distributing is explained in detail in conjunction with FIG. 1.

At step 610, the plurality of labeled groups from the plurality of queues are transmitted to one or more crowdworkers based on the third pre-defined criteria. In an embodiment, the transmission of the plurality of labeled groups from the plurality of queues is facilitated by the distribution module 216. The distribution module 216 transmits the plurality of labeled groups to one or more crowdworkers depending on the third pre-defined criteria. The detailed process of transmitting is explained in detail in conjunction with FIG. 1.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, reducing costs, increasing returns on investments, improving process performance, freeing up resources for other uses, converting fixed costs to variable costs, and improving speed to market.

Various embodiments of the method and system for the text data entry from the electronic document have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implementable method for processing an electronic document comprising a plurality of text fields and a text label associated with each of the plurality of text fields, the computer implementable method comprising:
    extracting the plurality of text fields from the electronic document;
    grouping the plurality of extracted text fields to generate a plurality of groups;
    labeling the plurality of groups based on a first pre-defined criteria to generate a plurality of labeled groups;
    distributing the plurality of labeled groups in a plurality of queues based on a second pre-defined criteria; and
    transmitting the plurality of labeled groups from the plurality of queues to one or more crowdworkers based on a third pre-defined criteria.

2. The computer implementable method of claim 1 further comprising erasing the text label associated with each of the plurality of text fields.

3. The computer implementable method of claim 1 further comprising modifying the text label associated with each of the plurality of text fields.

4. The computer implementable method of claim 3, wherein the modifying further comprises one or more of blurring the text label or renaming the text label.

5. The computer implementable method of claim 1, wherein the extracting further comprises splitting the electronic document into a plurality of fragments, each fragment of the plurality of fragments corresponds to one or more of the plurality of text fields.

6. The computer implementable method of claim 5, wherein the splitting further comprises marking a plurality of coordinates corresponding to a periphery of each of the plurality of text fields.

7. The computer implementable method of claim 1, wherein the plurality of extracted text fields are grouped to generate the plurality of groups without disclosing the identity of a user.

8. The computer implementable method of claim 1, wherein the first pre-defined criteria comprises one or more rules corresponding to the labeling of at least one group of the plurality of groups.

9. The computer implementable method of claim 1, wherein the labeling comprises one or more of a security based labeling, a rejection based labeling, and a dependency based labeling.

10. The computer implementable method of claim 9, wherein the security based labeling is performed for the at least one group of the plurality of groups requiring confidential or restricted access.

11. The computer implementable method of claim 9, wherein the rejection based labeling is performed for the at least one group of the plurality of groups based on a probability of rejection, the probability of rejection is determinable based on one or more rejection criteria.

12. The computer implementable method of claim 9, wherein the dependency based labeling is performed for the at least one group of the plurality of groups based on dependency of the at least one group with remaining groups of the plurality of groups.

13. The computer implementable method of claim 1, wherein the second pre-defined criteria defines the distribution of the plurality of labeled groups to the one or more crowdworkers based on the labeling.

14. The computer implementable method of claim 1, wherein the third pre-defined criteria comprises one or more rules that define a delay logic and an intersection dependency logic.

15. The computer implementable method of claim 1 further comprising delaying the transmitting of an at least one labeled group of the plurality of labeled groups from the plurality of queues for a pre-defined time duration.

16. The computer implementable method of claim 1, wherein at least one labeled group of the plurality of labeled groups is transmitted based on a degree of dependency.

17. The computer implementable method of claim 1 further comprising processing the plurality of labeled groups by one or more crowdworkers to generate a processed text field data.

18. The computer implementable method of claim 17 further comprising storing the processed text field data in a database.

19. The computer implementable method of claim 1 further comprising receiving one or more electronic documents from a database.

20. A non-transitory computer readable medium for use with a computer, the non-transitory computer readable medium comprising a computer readable program code embodied therein for processing an electronic document comprising a plurality of text fields and a label associated with each of the plurality of text fields, the computer readable program code comprising:
    program instruction means for extracting the plurality of text fields in the electronic document;
    program instruction means for grouping the plurality of extracted text fields to generate a plurality of groups;
    program instruction means for labeling the plurality of groups based on a first pre-defined criteria to generate a plurality of labeled groups;
    program instruction means for distributing the plurality of labeled groups in a plurality of queues based on a second pre-defined criteria; and
    program instruction means for transmitting the plurality of labeled groups from the plurality of queues to one or more crowdworkers based on a third pre-defined criteria.

21. A system for processing an electronic document where the electronic document comprises a plurality of text fields and a text label associated with each of the plurality of text fields, the system comprising:
    a extraction module configured for:
        extracting the plurality of text fields from the electronic document;
        generating one or more groups by grouping the extracted text fields;
    a distribution module configured for distributing the at least one group to one or more crowdworkers, wherein the at least one group is processed to generate a processed text field data by the one or more crowdworkers; and
    a validation module configured to validate the processed text field data.

22. The system of claim 21, wherein the extraction module is further configured to erase or modify the text label associated with each of the plurality of text fields of the electronic document.

23. The system of claim 21 further comprising a labeling module configured to label one or more groups to generate a plurality of labeled groups.

* * * * *